Aug. 15, 1967 D. J. CRIMMINS 3,336,434

WIRING SYSTEM AND CONNECTION

Filed Feb. 3, 1964

5 Sheets-Sheet 1

INVENTOR.
DAVID J. CRIMMINS
BY
Kenyon & Kenyon
ATTORNEYS

WIRING SYSTEM AND CONNECTION

Filed Feb. 3, 1964 5 Sheets-Sheet 2

INVENTOR.
DAVID J. CRIMMINS
BY
Kenyon & Kenyon
ATTORNEYS

Aug. 15, 1967 D. J. CRIMMINS 3,336,434

WIRING SYSTEM AND CONNECTION

Filed Feb. 3, 1964 5 Sheets-Sheet 3

INVENTOR.
DAVID J. CRIMMINS
BY
Kenyon & Kenyon
ATTORNEYS

INVENTOR.
DAVID J. CRIMMINS
BY Kenyon & Kenyon
ATTORNEYS

Aug. 15, 1967 D. J. CRIMMINS 3,336,434

WIRING SYSTEM AND CONNECTION

Filed Feb. 3, 1964 5 Sheets-Sheet 5

INVENTOR.
DAVID J. CRIMMINS
BY
Kenyon & Kenyon
ATTORNEYS

United States Patent Office 3,336,434

Patented Aug. 15, 1967

3,336,434

WIRING SYSTEM AND CONNECTION

David J. Crimmins, Pennington, N.J., assignor to The Thomas & Betts Co., Elizabeth, N.J., a corporation of New Jersey Filed Feb. 3, 1964, Ser. No. 342,021
20 Claims. (Cl. 174—72)

This invention relates to a novel back panel wiring system or wiring harness for computers or other devices, as well as a method for forming said wiring system. More particularly, this invention relates to a programmable system of back panel wiring employing flat conductor cables in a novel arrangement and system for providing a two dimensional system of effecting $x$ and $y$ connections between various elements in the type of computer which employs plug-in modular electronic packages.

This invention is designed to replace previous panel wiring systems or wiring harnesses which have been employed cutomarily in the art. The most common system which is currently in use involves a system whereby an operator manually attaches the leads between various contacts which form a part of the back panel in order to effect the desired interconnections between elements of the panel. This system requires a detailed wiring diagram and requires that the operator effect the connection in absolutely correct manner or the entire system is inoperative to accomplish the purpose for which it is intended. Needless to say, this type of back panel wiring system is exceedingly tedious and subject to many errors. For that reason, it is by far the most expensive system which can be employed and makes it essential that the entire computer be built and checked at the factory prior to the time that it is put into use.

The operator may, in the manual system for wiring a back panel, effect the connections on the back panel by physically soldering the leads to the respective contacts. When taper pin terminals fixed to the ends of the leads are used, the operator must use a special insertion tool to insert the taper pin terminals into prepared contacts in the connectors to which the modular packages are plugged.

In conducting the manual soldering operation, the operator must be extremely careful to assure that the soldered connections are correctly made, both insofar as the attaching of the leads to the proper terminals and assuring that the soldered connection is effective to provide for an electrical interconnection. In the system in which taper pin terminated leads attached thereto are used, it is again necessary that the taper pin terminals, as well as their contacts, into which they fit, are properly formed and mated in order to assure the correct electrical interconnection between elements.

Because of the nature of the above-described manual wiring methods and their extremely high labor cost, there are other alternatives which have been suggested and are currently being used to replace the taper pin terminal type of interconnection, as well as the soldering type of interconnection. One of these is the manual system in which previously stripped leads are wrapped by a special wire wrapping tool onto special terminals. In this manual method an operator using a wire-wrap gun actually spins the conductor, which has been stripped of its insulation, onto an appropriate pin of a connector. This involves the use of a special wire-wrap gun to assure a tight interconnection between the conductor and its pin. The conductor is then drawn out to its appropriate length in order that it can reach the pin to which the other end of the conductor is to be attached. That end, which has also been stripped, is then wrapped onto the appropriate pin. This manual wire-wrap system is slightly more economical than the solder system.

In order to eliminate as much as possible the manual element of this wire-wrap system, equipment has been designed and built in order to effect, by automatic programming, the proper wire-wrap connections between terminals having wire-wrap ends or posts.

This automatic equipment is exceedingly complex. To effect the proper connection, the automatic wire-wrap equipment automatically processes a wire through equipment which is essentially a mechanical X–Y plotter. The equipment strips the wire, places the conductor into a wire-wrap bit which is positioned over a pin on one back panel connector element. The bit is then programmed downwardly, and after it has descended to the proper position, the bit wraps the wire around the pin. Next, the equipment strings out a run of wire to the next pin in the program sequence, to which the opposite end of the lead is to be attached. This unattached end is then stripped and inserted into another wire-wrap bit which descends to and affixes that end of the conductor onto the appropriate pin. Following this, the next step in the program sequence is continued automatically on a separate length of wire until all of the interconnections have been properly formed on all of the pins of all of the back panel connector elements involved.

As can be seen from this brief description of the automatic wire-wrap equipment, it is exceedingly complex and is very expensive to build and operate. Yet, this device merely replaces the manual step of affixing a conductor, one end at a time, onto an appropriate terminal.

The system of this invention is a programmable back panel wiring system which obviates many of the difficulties previously experienced with existing systems. In place of single round wire conductors, the system of this invention ideally employs flat multiple conductor cables. The flat conductor cables employ a plurality of conductors positioned parallel to each other in a flat configuration. While the conductors themselves normally have a thin rectangular cross section, they may have a round or oval cross section. Throughout this specification and in the claims, references to flat conductor cables are intended to include not only the usual type of rectangular cross section conductors but also any arrangement of conductors joined by insulation and arranged in a parallel manner in a substantially flat configuration, whatever their cross sections may be.

The conductors may be insulated on both sides of the flat cable or only on one side of the flat cable. If both sides are insulated, then, at periodic intervals, one or both sides may be stripped of insulation in order to expose the conductors themselves. Depending upon the amount of contact pressure employed to effect interconnections, the conductors may be unplated or plated with precious metals, semi-precious metals, or tin.

In some systems wherein flat conductor cable may be employed in the future, it will not be necessary that high contact pressures be employed, and it will be very satisfactory for the flat conductor cable to be only insulated on one side, and no plating will be necessary. In such areas as home entertainment devices and appliances, a wiring system of the type of this invention can be employed, and the connecting elements will be such that a sufficient amount of contact pressure will be available and no plating will be necessary. The fact that no plating is employed materially reduces the cost of the wiring system, and where the end use is employed, which is not rigorous, the connections will be effected with a sufficient degree of pressure to allow the appliance or home entertainment device to be operated for its entire life without being sensitive to degradation and neither resort to high contact pressures nor plating of the conductors in the cable will be necessary.

The system of this invention involves a two dimensional wiring harness or wiring system. One dimension of the wiring system is formed by at least one X run of flat cable. The other dimension of the system is formed by one or more Y runs of flat cable. For the sake of convenience, the system of this invention, as well as the method of preparing the wiring system, will be described in terms of a computer which employs a back panel wiring system necessary to effect interconnection between plug-in modular units in the front panel thereof.

The back panel wiring system of this invention involves connecting an X run of flat cable which is directly connected to each plug-in receptacle. Thus, the package or module which plugs into a receptacle in the front panel of a computer is connected to an X run of conductors in the flat conductor cable attached to the receptacle. This X run cable extends backwardly until it intersects, most appropriately at right angles, with a Y run of cable. The Y run of flat conductor cable is prepared so that at least the portion which intersects the X run of cable has its conductors exposed. Likewise, the X run, at the point of its interconnection with the Y run, is also exposed. An X–Y connector element is positioned to contact both the intersecting X and Y runs of conductor cable and has means to perform the function of forcing the exposed conductors towards each other at appropriate points to effect an electrical contact between conductors in the X run and conductors in the Y run.

In order to prevent all conductors in the X and Y runs from being interconnected, a dielectric mask is positioned between the exposed portions of the two flat conductor cables. At selected points of intersection of X and Y conductors, openings are provided in the mask which permit the desired X and Y conductors to be forced into contact with each other only through the openings in the mask and thus effect the selected interconnections.

In the preferred embodiment of this invention described herein, the Y run, or vertical run, of flat conductor cable is continuous for each section of the computer's back panel. In other words, a continuous length of flat conductor cable is run alternately up and down so that it interconnects a plurality of X runs, the number of which will depend upon the number of module receptacles in the vertical length of the particular section of the computer involved. The number of loops which are formed in the Y run of cable is dependent upon the number of module receptacles in the horizontal width of the particular section of the computer which is involved.

The dielectric mask is continuous and is of a length substantially the same as the Y run. The continuous mask is prepared by the key-punch machine. The positions of each selected X and Y interconnection is programmed from circuit diagrams into the key-punch, either by an operator or by a computer. The key-punch punches out perforations or openings in the continuous mask for each of the X–Y run intersection points. The number and position of the openings for a particular X–Y run intersection will depend on the number and position of intersections of individual X and Y conductors which are to be interconnected.

The prepared mask and Y run of flat conductor cable are fed together in timed sequence by appropriate registering devices which insure that the area of the mask having openings formed therethrough is properly registered with the exposed conductors of the Y run of cable. Then the continuous Y run of cable and the continuous mask are carried to a point at which an X run of cable if being fed towards them in a transverse direction. The end of a length of the X run of flat cable has its conductors exposed on at least the side thereof adjacent the mask and the exposed conductors on the Y run of flat cable. At the juncture of X run, Y run and mask, an X–Y connector physically attaches the three elements together, temporarily at least, so as to hold the two flat conductor cables together with the appropriate area of the prepared mask interposed between their respective exposed conductors. The connectors themselves, as well as the cable and mask, may be keyed in such a manner so that each X–Y connector is unique and so that the only set of connections that can be effected by the particular connector is that set desired for that one specific X–Y connector in the system. These steps are repeated until an entire harness is prepared for a section of a computer.

The system provides for utmost flexibility, since an entire back panel wiring harness or system can be programmed and the X run and Y run of flat cables prepared for an entire section of the computer at one time.

If it is desirable to join together adjacent sections of the computer, this is easily accomplished, since there are two free ends on the Y run of cable. Thus, the Y run of adjacent sections of the computer may be physically attached together by interconnectors, thus increasing the flexibility of the system. Alternately, if only one end of the Y run is to be interconnected to an adjacent section of the computer, then only one interconnector is provided, and the other end of the Y cable is provided with a dead end.

Alternately, a specially prepared connector may be used to effect selective interconnection of portions of adjacent loops or adjacent conductors of the Y run of cable so as to route signals through another conductor of the cable. This selective interconnection type of connector may be programmed in the same manner for attachment to the Y run of cable at the appropriate place in the same manner that the basic X–Y connection of the computer system is programmed.

As the system has just been described, each module receptacle connector has a separate X cable run. However, in order to form the most direct path between the points on the module connectors which are to be interconnected, a continuous X run of cable can be provided between connectors. Also, since the X run of cable can be made in the form of continuous loops, it likewise may have one or more interconnecting elements so that it can be connected to adjacent sections of the computer in the X direction, or it may be provided with a dead end, thus isolating the particular X run of cable in one section from the remainder of the computer sections. As has been described above, a connector may be used on the X run of cable which provides for selective interconnection of the various conductors in a run of X cable so as to route circuit intelligence into another conductor. As has been described above, this special interconnection connector is programmable in a manner similar to that described for the basic X–Y connector in the system of this invention.

In order to effect the proper connection between the X and Y conductors in their respective flat conductor cables, high contact pressures are or may be necessary. It is of course realized that if precious metal plating is resorted to at the areas of interconnection between the conductors, it is quite possible to have lower orders of pressure. However, since it is possible to provide for very high contact pressure through means yet to be described below, it is believed that this system will permit tin coating or semi-precious metal coating of the conductors and thus avoid the expense of precious metal coating while not sacrificing the reliability of the system.

As described below, the contact pressures are preferably effected by providing for a bar along the entire width of a particular section of the computer. The bar has cam faces on opposite ends so that when the bar is rotated, all of the X–Y connectors are subjected simultaneously to heavy pressures, thus forcing the X and Y conductors into contact with each other through the openings which have been punched in the mask.

In a modification of the invention herein described, it is possible to replace the X runs of cable by providing for a novel type of module connector element, which, for convenience sake, will be referred to as an X connector. The X connector element has parallel conductors formed in it which are the equivalent of the parallel conductors in the novel flat cable. Its conductors will be exposed in the interior portion of the X connector and each will replace an X run of flat cable. The conductors of the Y run of cable intercept the conductors of the X connector exactly in the manner described above. Likewise, a continuous mask, prepared as described above, is positioned between the exposed conductors of the Y run of cable and the conductors in the interior portion of the X connnector.

In the modification of the system of this invention, the X run of cable is replaced by the special X connector, the system as a whole will be substantially more compact. In addition, a special series of test pins or random wiring pins can be affixed to the end of each of the X connectors to protrude from the rear end thereof. This then permits the testing of circuits and permits random wiring by physically interconnecting round wire between selected pins. Also it permits the use of flat cable jumper elements to interconnect between adjacent X connectors at the same level or different levels of a section of a computer or to an adjacent section of a computer, if such is desired.

The system of this invention provides for ready repair and circuit change in the field, a feature which is not present in any other known back panel wiring system. Each X and Y connector can be independently opened without disturbing the remainder of the X–Y connectors. A new mask can be prepared to replace the one in use when a new interconnection or set of interconnections is desired. Thus, the pressure is released on the row of X and Y connectors containing the one for which a new interconnection is desired. The selected X and Y connector is then opened and the continuous mask is clipped above and below the connector. Then, the old section of mask can be removed. Since the old mask section which is to be replaced is preferably positioned-coded and registered with respect to its connector, the new mask to be replaced is likewise provided with the same type of registering indicia and coding so that it may be inserted only at the particular X and Y connection which is being altered. The new mask may then be inserted, properly registered with respect to its connector and its X and Y cables and the X and Y connector closed. This may be done quite easily and it thus provides for a flexibility not previously present in current systems.

If it is desirable to avoid passing a pulse throughout the complete length of the Y run of cable, the flat cable may be altered by punching through the conductors and, particularly, the Y run thereof in order to open those conductors and make it possible to use the portion of the conductor below that point for a new interconnection. This likewise improves the flexibility of the system to an extent not presently available.

In the system which has been described above, it will be readily apparent to those skilled in the art that a flexibility, both mechanical and electrical, is present in the system of this invention, which is not presently available to computer designers and builders. The mechanical flexibility comes about because of the use of flat conductor cables which are flexible enough to permit a wide variety of shapes and configurations while maintaining the conductors themselves in substantially parallel relationship. The cable can be bent or twisted, if such as desirable, in order to correctly position the conductors in almost any desired arrangement.

The electrical flexibility of this invention is as great as is the imagination of the person designing the circuitry for the back panel of a computer. Complete flexibility is provided, since the number of conductors in the flat cable can be almost any desired number and, as has been described above and as will be further described below, the possibility of multiple use of a single conductor within a flat cable wiring system, such as described by this application, permits a degree of electrical flexibility not previously provided.

Additionally, it is an important feature of this invention that a novel method of computer wiring has been provided. The entire back panel of the computer can be programmed by the method described above and can be constructed automatically with little or no manual labor being involved. It is possible for the computer designer to provide the person employing the method of this invention with his circuit intelligence by means of a preprogrammed computer tape which can be employed to drive the key-punch unit in order top rovide for the specific electrical connections for each X and Y connection in the entire system. Likewise, it is possible, as will be described below in the method, for the same computer tape containing the computer circuit intelligence to be used to selectively strip the Y cable so as to provide for the necessary areas of the exposed conductor, to strip the X run of cable and cut it into appropriate lengths, and to program the position of the X–Y connectors at the respective junction points of the X and Y runs of cable so that the interconnections are at least temporarily formed by the time the unit is completed. This degree of automatic programming of a computer wiring harness for back panel wiring systems contains a degree of flexibility not available in any other known system.

Furthermore, it can be readily seen that the equipment necessary to practice the method of this invention and to form the novel wiring harness of this invention is readily available and can be inexpensively operated. The system of this invention will materially reduce the cost of the preparation of a computer back panel wiring harness. In addition, it will make possible the prefabrication of the back panel wiring harness and its prepackaging so that it can be shipped as a unit to the field and merely mounted in a rack provided therefor at the area where the computer is to be employed. This contrasts with current systems which require complete building of an entire computer at a plant and then the shipment of the unit to the appropriate location. Such an arrangement is necessarily considerably more expensive than the system which is available with the method of this invention and the novel wiring harnesses.

Additionally, it can be seen that the circuit design for the computer can be readily altered in the field by only slightly skilled personnel, since the mask which in effect governs the particular interconnections for a specific X–Y connector can be readily removed and replaced by another mask designed to effect new interconnections. This feature of ready repair and replacement is one which is not available in any other known system without a great possibility of a multiplicity of errors arising.

In addition, the embodiment of this invention employing the special module receptacle which replaces the X run of cable provides for a system which can be readily adapted to almost any type of wiring harness where a two dimensional series of X and Y connections is desired.

Because of the use of flat conductor cables, it is possible to achieve a wiring density not available in any other known system. This is true, since the flat conductor cables themselves have very accurately positioned center-to-center dimensions between conductors. Since this is the case and since no manual operation is required at all in order to effect the respective connections, it is possible to pack the density of wiring interconnections and wires to a much greater degree than is possible in any other known system. This permits the size of the computer to be substantially less, permits the length of conductor employed to effect connections across the back panel to be substantially shorter and generally reduces the weight and the cost of a computer.

Some of the desirable features and advantages of the system have been described. More will be described in connection with the drawings illustrating an embodiment of this invention, in which:

FIG. 1 is a perspective of an idealized computer of the type described employing the invention of this application, illustrating the front panel of a computer having plug-in modular elements. The system as such is highly idealized and it will be readily appreciated by those skilled in the art that the purpose of the system as shown is merely to indicate the general arrangement of elements rather than the specific form which a computer employing this invention may take.

Figures 1, 2, 3:
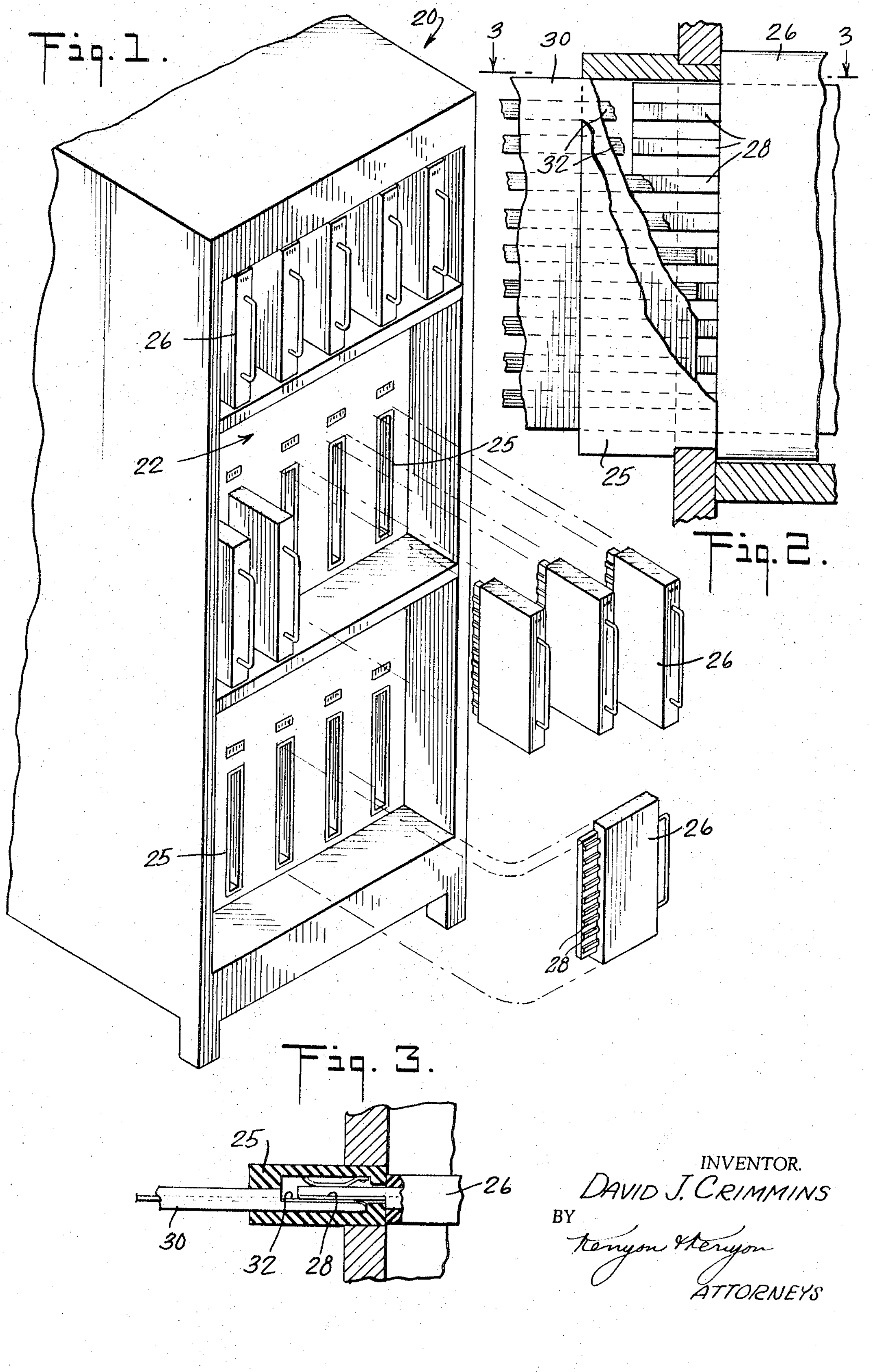
FIG. 2 is a side view of a module connector illustrating the position of the pins or conductors of the module and the conductors of an X run of flat cable, with portions cut away for clarity.
FIG. 3 is a cross section of the device of FIG. 2 taken on the line 3—3 of FIG. 2.

Referring now to FIGS. 1–3 illustrating a schematic or idealized computer 20, it will be seen that front panel 22 of the computer 29 is not altered. In other words, receptacles 25 are provided for the normal plug-in packages 26 which are employed in computers in order to carry out the appropriate functions for which the computer 20 is designed.

Each of the packages 26 has at its inner end a series of strips 28 which form, as a part of the printed circuit, the interconnection for the computer 20 and the various elements which make up the package 26. The strips of conductive material 26 are plugged into receptacles 25 which also provide for an interconnection for each of the strips 28 to the back panel wiring in order that a circuit may be completed between the elements of the packaged 26 which are being used to the elements of some other package 26 in order to obtain the desired function and to effect the proper circuit.

In the system of this invention shown in FIGS. 1–10, the receptacles 25 may be of the ordinary kind adapted to receive the flat cable 30, with its conductors 32 exposed. The flat cables 30 form the X runs of the system of this invention.

As will be seen below, in another embodiment, which is described and illustrated in FIGS. 11–13, a special X connector 70 may be used to replace the X runs of cable 30. However, in the system illustrated in FIGS. 1–10, a length of X run of cable 30 is employed. It will be this system which is described first.

The plug-in package 26, with its printed or other circuitry and its connections 28 provided for on its inner end 1, is plugged into a normal flat conductor cable receptacle 25. Connections are thereby effected between the various conductors 32 of the X run of flat cable 30. Each X run of flat cable 30 extends backwardly to the point 34 at which the X and Y connector 36 physically connects an X run of cable 30, a continuous dielectric mask 38 and the continuous Y run of cable 40 together.

It will be seen that in most instances, the X run of cable 30 is a short run which merely extends to the X–Y connector 36. In other instances, for purposes of illustrating the system of this invention, it will be seen that a X run of cable 31 is continuous from one receptacle 25 to another. This provides for the possibility that, in the design of circuitry box a particular back panel wiring harness may be advantageous to run the conductors 32 of the X run 31 from one recepetacle 25 to another on the same level. At the same time, the X run 31 may intercept more than one of the vertical loops of the Y run of flat cable 40.

Figures 4, 5, 6:
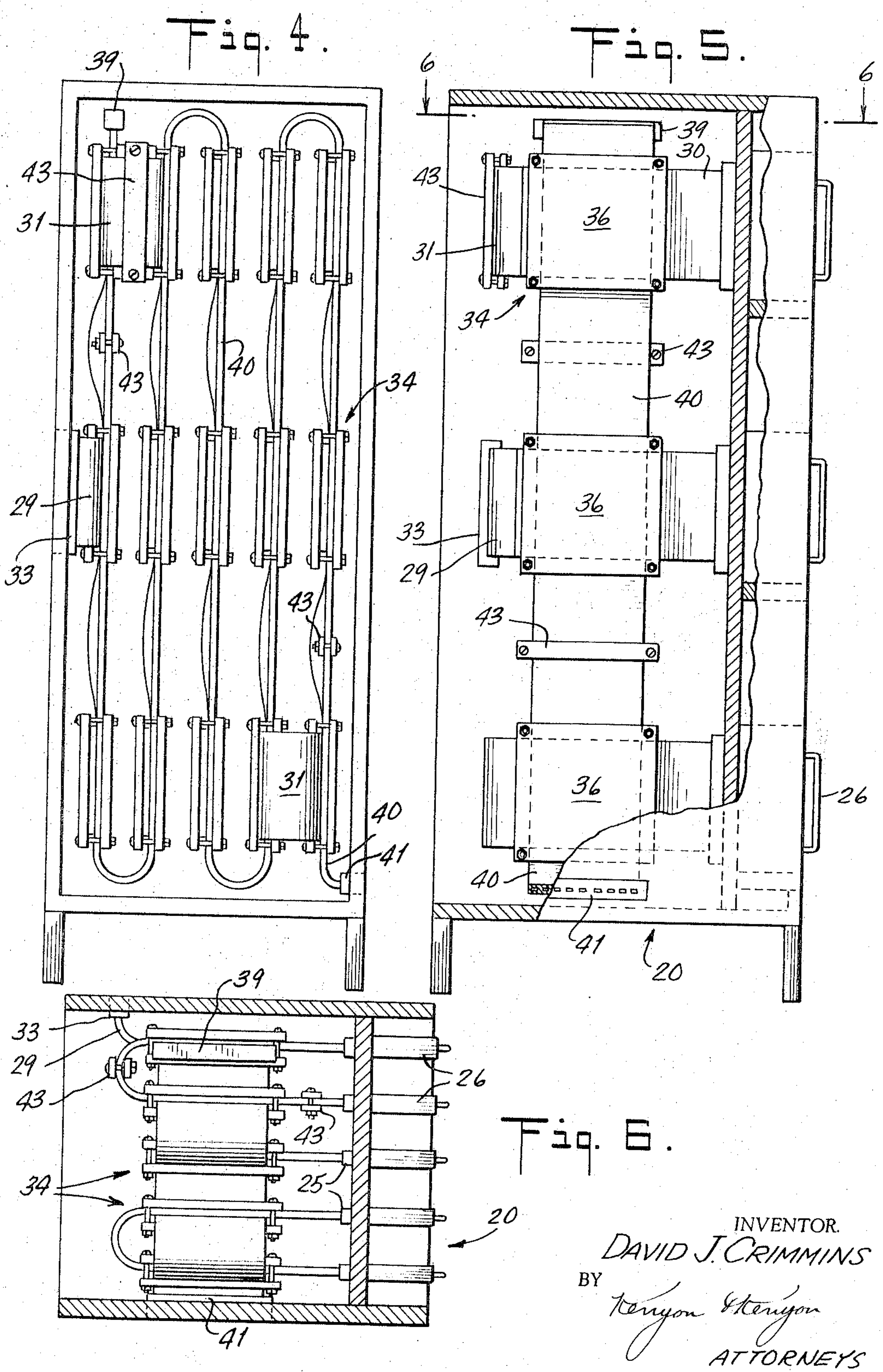
FIG. 4 is a rear view of one form of the back panel wiring system of this invention.
FIG. 5 is a side view illustrating the back panel wiring system of this invention, showing in partial section the frame of the computer in which the system is mounted.
FIG. 6 is a top view in partial section taken along the line 6—6 of FIG. 5, again illustrating the system of this invention.

In the system illustrated in FIGS. 4–9, a single Y run of flat cable 40 is employed to intersect a number of X–Y connectors 36, both in the vertical and horizontal directions, in order to provide for a wiring harness for connecting receptacles 25 of the entire section of computer 20 illustrated. The system illustrated in FIGS. 4–6 is the basic system of this invention. At the point 34 where an X run of flat cable 30 intersects a portion of the Y run of cable 40, the respective conductors 32 of the X run of cable 30 and the conductors 42 of the Y run of cable 40 are exposed. To prevent all of the conductors 32, 42 from being interconnected, the continuous mask 38 is provided.

Figures 7, 8, 9:
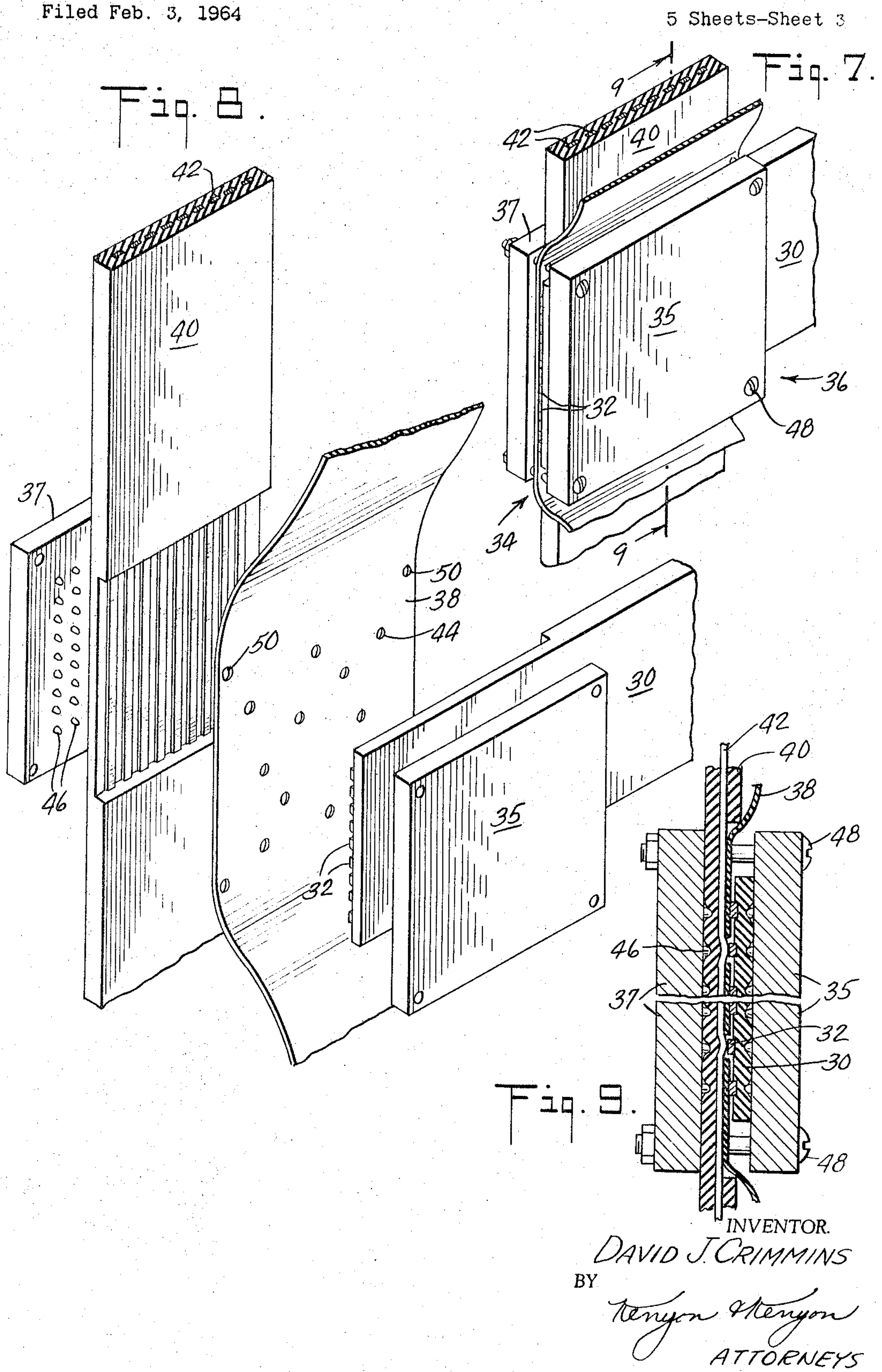
FIG. 7 is a perspective view of an X–Y connector of a particular type which is useful in this invention and shows the position of the intersecting X and Y runs of cable and the mask.
FIG. 8 is an exploded perspective view of the X–Y connectors and X and Y runs of cable, illustrated in FIG. 6, which shows the respective elements which make up one form of an X–Y connection of this invention.
FIG. 9 is a cross-sectional view of the connectors illustrated in FIG. 7 taken along the line 9—9 of FIG. 7.

FIGS. 7–9 illustrate a typical intersection point 34 wherein an X run of cable 30 intersects the Y run of cable 40, and interconnection between selected conductors 32, 42 is permitted by perforations 44 in mask 38. In order to effect contact of conductors 32, 42 through the perforations 44 in mask 38, it is necessary to provide for an X–Y connector 36 having spring members 46 which urge all conductors 32, 42 towards each other. The spring members 46 are formed on the opposed faces of the two halves 35, 37, and when clamping means, such as bolts and nuts 48, urge the respective halves 35, 37 towards each other, the spring members 46 force the respective conductors 32, 42 towards each other and into contact through the perforations 44 in mask 38. The bolts 48 pass through registration means 50 in mask 38, thus assuring that the position of mask 38 is in a properly fixed location. As illustrated, the registration means 50 are simple openings. It will be appreciated that a system of notches, irregularly shaped openings and similar devices could be used for the purpose of registering the mask 38 in its proper oriented relationship between the exposed conductors 32, 42 of flat cables 30, 40.

While not shown in the simplified form of device illustrated in FIGS. 7–9, it may also be desirable to provide a similar type of registration code for the respective areas of cables 30, 40 so that identical registration indicia, openings, or the like, are provided for all of the elements which make up a particular point 34 of intersection between an X run of cable 30 and the Y run of cable 40. For the purposes discussed below, registration means of one kind or another is desirable, and it may be preferable to provide each X–Y connector and the elements which make up each separate intersection point 34 with a different registration code.

In the device illustrated in FIGS. 7 and 9, bolts 48 are employed for urging the two halves 35, 37 of X–Y connector 36 towards each other. It will be appreciated that any suitable means, such as hinges and locks, could be employed in order to bring about the desired function of forcing conductors 32, 42 through perforations 44 in mask 38. The function which must be accomplished by the means employed for urging the conductors towards each other so that there be applied a sufficient amount of compressive force so that the spring members 46 will urge conductors 32, 42 through perforations 44 with a sufficient amount of force to effect a good electrical connection between conductors 32, 42.

Depending upon the type of application involved and the degree of reliability required, as pointed out above, conductors 32, 42 may be plated with precious metal, semi-precious metal or may be unplated. Because it is possible to exert a substantial amount of compressive force on the cables 30, 40 by such mechanical means as described above, it may be possible to avoid the necessity for precious or semi-precious plating on conductors 32, 42.

Figures 10, 11, 12, 13, 14:
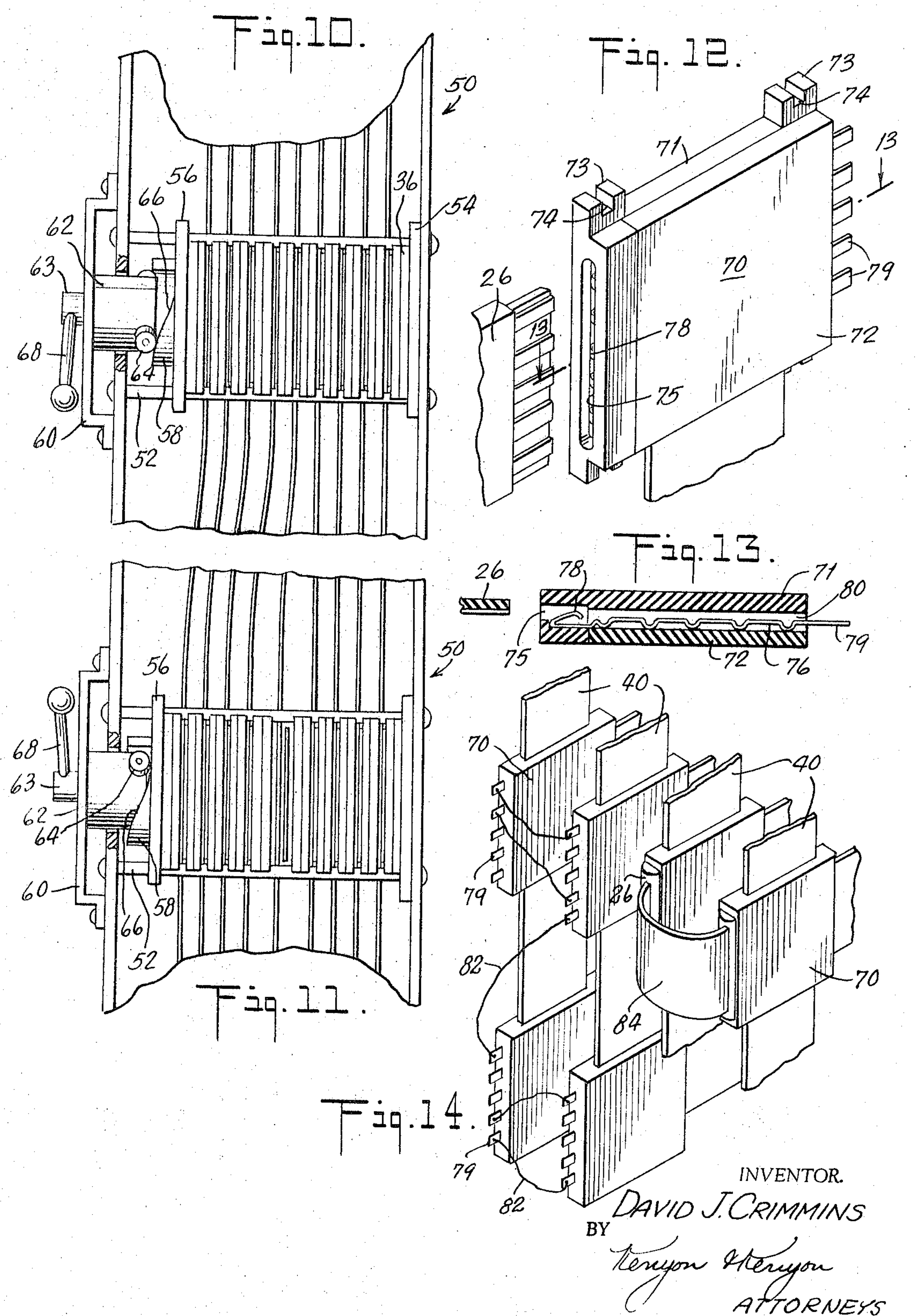
FIG. 10 is a partial rear view of a form of the invention wherein a tie rod is used to mechanically compress all of the X–Y connectors in one row in a particular section of a computer in order to effect a high degree of contact pressure within the X–Y connector.
FIG. 11 is a view similar to FIG. 10, except that the tie rod system is illustrated as being in the open position so that the X–Y connectors are in position to be opened for repair or for replacement of a selected mask.
FIG. 12 is perspective view of a form of connector used in the embodiment of this invention in which a special connector is employed to replace an X run of cable.
FIG. 13 is a cross section of the special connector illustrated in FIG. 12 taken on the line 13—13 of FIG. 12.
FIG. 14 is a partial view in perspective of the rear portion of the computer employing connectors of the type illustrated in FIG. 12 and demonstrating the ability for random inter-wiring and other connections available using this type of wiring system.

In FIGS. 10 and 11, an alternate system of obtaining compressive force on the X–Y connectors 36 is illustrated in the embodiment illustrated in FIG. 10, tie rods 52 are provided which are carried by the side walls of the computer 20 section involved for each level thereof. A bearing plate 54 is mounted on the interior of one side wall of the computer 50, as illustrated in FIG. 10. A movable shoulder member 56 is carried on the tie rods on the other side of the computer 20. A cam member 58 is rigidly attached to shoulder member 56. A bracket 60, carried on the exterior wall of the computer section 50, carries a rotary shaft 62 journalled therein. The shaft 62 has cam followers 64 on its inner end and in contact with the inclined surfaces 66 of cam member 58. In the condition illustrated in FIG. 10, the handle 68 attached to the projection 63 of shaft 62 is in its downward position. In this position the shoulder member 56 is moved to its inner position as far as possible and exerts a constant compressive force on all of the X–Y connectors 36, which are urged toward bearing plate 54. It will be appreciated that this mechanical means of applying mechanical compressive force is simple and reliable and yet is capable of effecting very high orders of compressive force and thereby causing high contact pressures between conductors 32, 42 of the X runs of cable 30 and the Y runs of cable 40.

When handle 68 is rotated upwardly, cam followers 64 ride down inclined surfaces 66, thus removing the pressure on X–Y connectors 36. This will permit any selected X–Y connector 36 to be opened so that the section of mask 38 at that particular point 34 may be clipped out and removed.

Similarly, a newly prepared mask may be inserted, properly registered with respect to the connector halves 35, 37 and the cables 30, 40. Following such a repair or replacement, the row of X–Y connectors 36 may again be subjected to compressive force by rotating handle 68 downwardly to apply, simultaneously, a compressive force on all of the X–Y connectors 36.

In the system illustrated in FIGS. 4, 5 and 6, an X run of cable 29 is provided with a device 33 which is an interconnector so as to permit interconnection of an X run 29 with an X run of cable in an adjoining computer section. Similarly, the Y run of cable 40 may be provided with an interconnection 41 so that the Y run 40 in one computer section may be interconnected with the Y run of an adjacent computer section. Also a dead-end device 39 may be provided on the opposite end of the continuous run of Y cable 40, if desired.

In the system illustrated in FIGS. 4–6, 10 and 11, there is a considerable space in the vertical direction between X–Y connectors 36. It will be appreciated that, since the flat cables 30, 40 are flexible, this distance may be materially shortened in order to achieve a more compact device, if such is desired, either by cutting down the length of the Y run of cable 40 between the X–Y connectors or by rotating the X–Y connectors so as to have all X–Y connectors in one row tilt one way while the X–Y connectors in the next succeeding row be tilted in the opposite direction. In most instances this will not be necessary, but if a more compact device is desired, this can be done.

If it is desired, a clipped-on connector 43 may be employed on either the X run of cable 30 or the Y run of cable 40 in order to interconnect conductors of the same run of cable together. This would permit a material shortening of the distance a pulse would have to travel if the necessary result could be obtained by interconnecting any two of the parallel conductors of a cable 30, 40. The system described above provides for the most flexibility if the Y run of cable 40 is not interrupted and its conductors 42 are continuous from one end of the cable 40 to the other. If it is desirable, however, to reuse a particular conductor 42 in the Y run of cable 40, a hole may be punched through the flat cable 40 at the point of the selected conductor 42, thus interrupting its continuous character. This would normally occur after the particular conductor 42 had already been interconnected to a conductor 32 in an X run of cable 30. Such an interruption of a conductor 42 would then permit its reuse for the purpose of providing another circuit path independent of the remainder of the conductor 42 beyond the point at which it had been connected to a conductor 32. It will be appreciated, however, that any time any of the conductors 32 of an X run of cable 30 or the conductors 42 of the Y run of cable 40 are interrupted, the system will lose a degree of flexibility. This need not, however, be serious, since in many instances the system will not require the vast amount of flexibility that is inherent if none of the conductors 32, 42 are at any point interrupted.

In the system described above, it has been assumed that a prepared mask 38 has been properly registered with its perforations 44 in correct relationship with the conductors 32, 42 of cables 30, 40. Also, there has been described a means whereby any one of the X–Y connectors 36 could be opened for the purpose of replacing the portion of the mask contained therein. It should also be appreciated that the entire system could be effectively rewired by beginning at one corner of the machine, at, for example, the X–Y connector 36 at the top lefthand corner illustrated in FIG. 4, and by successively following the path of the Y run of cable, opening each X–Y connector 36, the entire mask could be removed. A newly prepared continuous mask could then be inserted, and effectively, the entire back panel of the computer section 20 could be rewired.

Referring now to FIGS. 12, 13 and 14, in which a modification of the system of this invention is partially illustrated, it will be seen that the X run of cable 30 may be replaced by a specially prepared X connector 70. The X connector 70 is an enlarged module receptacle which would replace the module receptacle 25 discussed above which serves to interconnect a plug-in package 26 with an X run of cable 30.

The X connector 70 is comprised of two halves 71, 72. The rear half 71 has mounting posts 73 formed on it. Any form of mounting post 73 is satisfactory, but the ones illustrated involve slots 74. The slots 74 in the inner end of X connector half 71 may conveniently be attached through the front panel wall of a computer section 50 so that a plug-in package 26 with its conductors 28 may be inserted therein. Alternately, the front end of X connector 70 may merely be positioned adjacent an opening in the front panel wall of a computer section 50 and the entire connector be supported by the interconnection between a plug-in package 26 being inserted through an opening 75 of X connector 70.

A plurality of conductor elements 76 are positioned within the X connector 70. The number of conductors 76 will depend upon the number of conductors 28 in the plug-in package 26. The spring elements 78 formed on the inner end of conductors 76 are biased upwardly so that, when plug-in package 26 is inserted into X connector 70 through opening 75, effective connections which are electrical will be formed between each of the conductors 28 of plug-in package 26 and the conductors 76 of X connector 70. A run of Y cable 40 with a portion of its conductors 42 exposed is positioned between the two halves 71, 72 of X connector 70, and a mask 78, which may be continuous, is interposed between the exposed conductors 42 of the Y run of cable 40 and the conductors 76 of the X connector 70. Perforations 44 in the mask 38 which have been previously prepared in accordance with a pre-determined circuit program permit the conductors 76 to be interconnected with conductors 42 of the Y run of cable 40 in the manner previously described.

The X connector 70 half 72 may be hinged onto the X connector 70 half 71 or may be physically connected thereto in any suitable manner which permits a compressive force to be applied on half 72 so that it forces the conductors 76, 42 into contac t with each other through perforations 44 in mask 38. While not shown, it will be appreciated that registering posts or other devices are preferably employed in order to insure accurate registration of the mask 38 with its X connector 70 and the Y run of cable 40.

Extensions 79 on conductors 76 are provided which extend through an opening 80 in the rear end of X connector 70. The availability of the extensions 79 makes it possible to effect random wiring where such is desirable. In other words, leads 82 may be attached by soldering, by wire wrap techniques, or by connectors of any suitable type so as to join extensions 79 of conductor 76 of one X connector 70 to an adjacent X connector 70 in the X direction or to another X connector 70 in the Y direction. This permits an increased degree of flexibility and may be employed in order to materially shorten the distance which a signal would travel.

If it is desired to have adjacent X connector 70 interconnector, a jumper member 84, as illustrated in FIG. 14, may be employed either in the direction illustrated or could be employed between X connectors in the vertical or Y direction. Again, this adds a degree of flexibility and also permits a shorter signal path where such is desired.

In addition, the system illustrated in FIGS. 12–14 permits a simplified trouble-shooting or testing procedure in order to determine that the circuits desired have been properly effected when the system is installed. In other words, in order to determine that the proper interconnections have been effected, the computer is often put through a procedure known as "ringing out" in which a bell or lamp is interconnected between various points of the back panel wiring to determine that the connections desired for the circuit have been, in fact, effected.

Since the half 72 is movably attached to the half 71, it is possible to provide for a system such as that illustrated in FIGS. 10 and 11 for supplying the amount of compressive force desired to effect interconnection between conductors 76 and conductors 42 in the Y run of cable 40. While the half 72 has been described as being physically attached to the half 71, it will be appreciated that if the half 72 may be formed as a molded portion of X connector 70 which is capable of being forced towards the half 71 and thereby effecting interconnection of conductors 76 and 42.

The system illustrated in FIGS. 12–14 can be programmed and prepared in the same manner as described generally for the system illustrated in FIGS. 4–9. Thus, the same steps in the method of forming a back panel harness is involved, with the single exception that there is no X run of cable 30 as such.

The method of preparing a back panel wiring as a harness generally involves the following steps. A continuous Y run of cable is prepared having selected areas of its conductors exposed. A number of Y runs of cable 30 or X connectors 70 having a plurality of conductors exposed therein are physically interconnected with the exposed areas of the conductors 42 of the Y run of cable 40. A mask 38 having perforations 44 prepared is interposed between the exposed conductors of the X element, be it a connector 70 or an X run of cable 30. The next step is to subject the Y element and the X element to a compressive force so as to cause the respective conductors of each to be urged towards each other, with the result that wherever there is a perforation in the mask element, a connection will be effected between an X element conductor and a Y element conductor. The contact pressure may be applied either by X–Y connector halves, such as X–Y connector 36, or by the tie rod system illustrated in FIGS 10 and 11 employing X–Y connector 36 or the X connector 70. Alternately, if registration means are employed, the X–Y connector 36 or the X connector 70 may be replaced by any suitable mechanical, pneumatic or hydraulic device which will subject the intersection points 34 of X elements and Y elements to a contact pressure sufficient to cause interconnection of conductors of the X elements and conductors of the Y elements.

Figure 15:
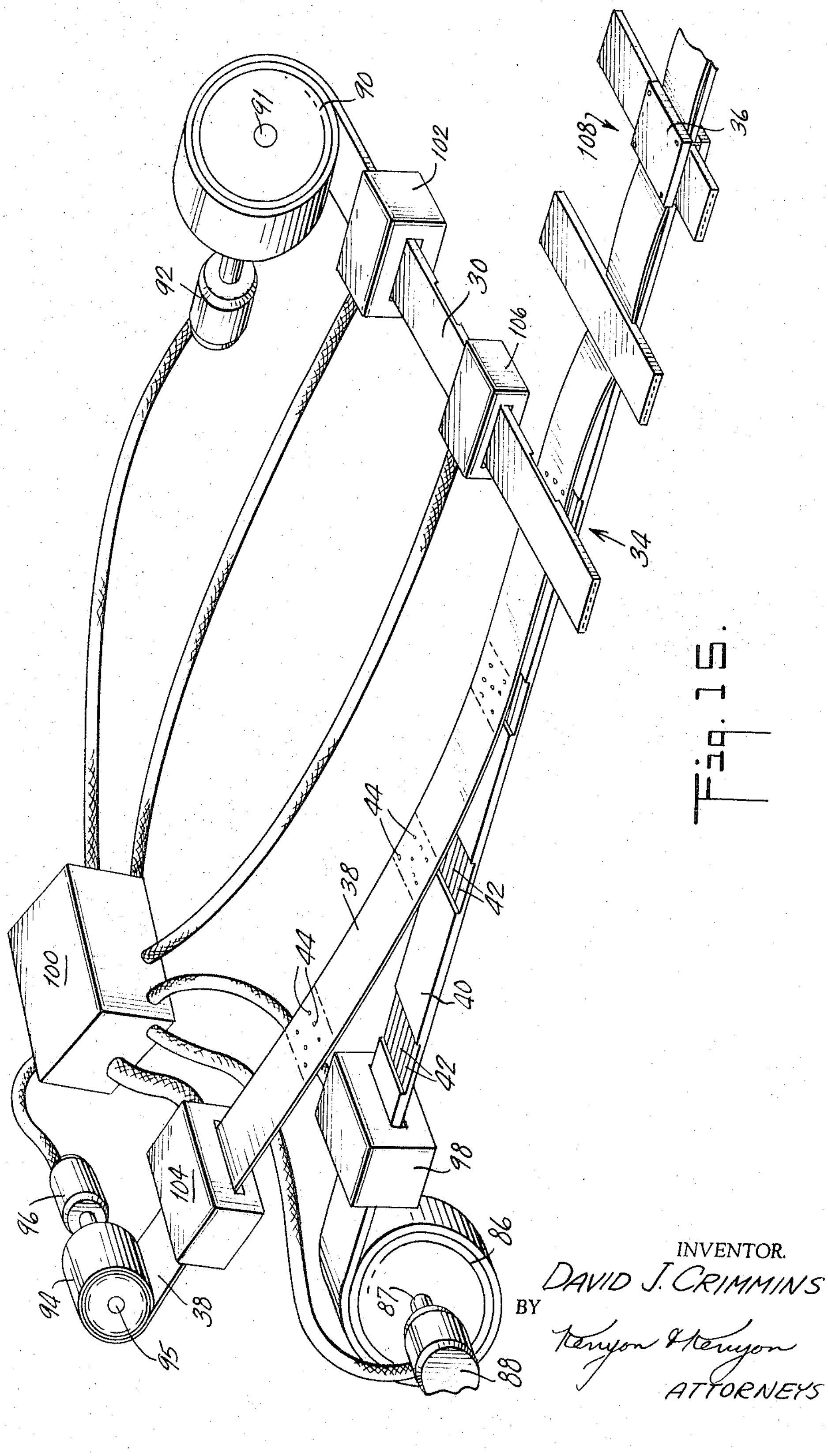
FIG. 15 is a block diagram illustrating the method of automatically forming the back panel harness of this invention.

One method of programing and preparing a wiring harness is illustrated in FIG. 15. A roll 86 of Y cable 40 is mounted on a shaft 87 driven by motor 88. A similar roll 90 of X cable 30 is likewise positioned on shaft 91 which is driven by motor 92. A roll 94 of mask material 38 is mounted on a shaft 95 driven by motor 96. As the Y run of cable 40 is fed towards an intersection point 34, the Y run of cable 40 is subjected to the action of a stripper element 98 which exposes conductors 42 at pre-determined intervals along the length of the Y cable 40. The feeding of Y cable 40 is controlled by a computer element 100 which also provides a control for the stripper element 98.

Similarly, the feed of X cable 30 from the roll 90 is controlled by the computer element 100 through a cutter stripper element 102. The cutter stripper element 102 controlled by computer 100 strips insulation from the X runs of cable 30 at selected intervals and, depending upon the length desired for the particular X run of cable 30, cuts the X cable 30, thus separating the individual X runs of cable 30 from the continuous reel of X cable on roll 90. The continuous mask 38 is drawn through a key-punch device 104 which punches perforations 44 at selected intervals along the length of continuous mask 38. The feeding of the mask 38 and the operation of keypunch 104 is controlled by computer element 100. As schematically illustrated in FIG. 15, the continuous mask 38 is fed to the intersection point 34 juxtaposed over the continuous Y run of cable 40 in registered relationship therewith so that at the intersection points 34, the pre-punched area of mask 38 is correctly positioned relative to the exposed conductors 42 of Y cable 40. At the point of intersection 34, the severed X run 30 is fed by X cable feeder 106 and the feeding thereof is controlled by computer element 100. Means (not illustrated) are positioned at the intersection point 34 to register and position the X run 30, the mask 38 and the Y run 40 into their proper relationship and to hold them together temporarily. As the operation continues the three elements are carried together beyond the point of intersection 34 to an X–Y connector attaching station 108 where the two halves of an X–Y connector 36 physically attach the elements together in their proper relationship. By successively carrying out the above-described procedure, the entire back panel harness is prepared in accordance with a previously prepared circuit. The computer is programmed so as to control the function elements 88, 92, 96, 98, 102, 104 and 106, thus insuring that the circuit diagram is translated by computer element 100 into a completed X–Y wiring harness system.

It will be appreciated that the interconnecting connectors 43, dead ends 39 or connectors 33, 41 may be programmed by computer element 100 for attachment to the wiring harness as desired in order to serve the purposes for those elements as described above. In addition, it will be appreciated that, where special X connectors 70 are employed to replace the X runs of cable 30, the X connector 70's halves 71, 72 may be attached to the mask 38 and Y run of cable 40 at the intersection point 34, in the embodiment of this invention as illustrated in FIGS. 12–14.

Once a harness has been thus prepared, it may be inserted into receptacles 25 to form the back panel wiring for a computer section 50. Likewise, when the system involves X connector 70, each X connector 70 may be physically attached to the rear of the front panel of a computer section 50, thus completing the back panel wiring for the computer section 50.

The completed harness may either be rolled up on a reel for shipment to the point of installation or may be folded in the general configuration illustrated in FIGS. 4, 5 and 6 so that it is in its proper relationship for connection to a section of computer 50.

While the method of preparing the wiring harness illustrated in FIG. 15 and described above is oriented by a control to a computer, it will be appreciated that the individual steps in the method of forming a wiring harness of this invention could be carried out manually. Of course the preparation of the mask could be controlled automatically while leaving the remainder of the steps to be carried out manually. There is, therefore, a great degree of freedom in the means by which the harness is physically prepared, which includes complete manual operation, part automatic and part manual operation, or complete automatic operation. The various mechanical and electrical elements which would be necessary for the complete or part automatic operation are well known and need not be described in any detail.

Any X–Y connector 36 or X connector 70 can be employed, which will carry out the necessary functions as described above. The X–Y connector 36 or X connector 70 must provide for an ease of registering cables 30, 40 with respect to each other with the mask interposed between them. Registering pins on one half of an X–Y connector 36, which mesh with register holes, are one way of accomplishing such registration. As described above, it will be desirable to provide each of the intersection points 34 with a separate form of registration means, as well as a printed code which identifies each of the separate X–Y connections and the area of mask 38 which is to be associated therewith. While it is preferable to use both registering means and coding to identify each intersection point 34, it will be appreciated that either or both will be satisfactory if adequate means of identifying each separate interconnection is made available.

Another function for the X–Y connector 36 or X connector 70 to perform is that of being capable of transmitting a sufficient amount of compressive force to effect interconnection of conductors of the respective X and Y elements through perforations 44 in a mask 38. Several ways of accomplishing this function have been described above.

The position coding or registering means of each X–Y interconnection will provide for a means of identifying any specific interconnection for purposes of repair or replacement by the means described above.

The system of this invention and the method of preparing it have been described above in connection with a particuar type of wiring harness which can be prepared. It will be appreciated that the environment in which this invention has been described is not the only use to which this invention may be placed. In other words, while a computer back panel harness has been described, it will be appreciated that many other electric and electrical devices involving a plurality of interconnections can be wired by using the system of this invention and the harnesses therefor can be prepared by the method of this invention. The advantage of being able to automatically prepare an entire wiring harness as a unit with the inherent flexibility as well as repairability makes the system of this invention superior to any other presently being employed. The manual systems as described above, as well as the automatic wire wrap techniques, each involve the formation of a single interconnection at each step. The possibilities for error in the manual system and the expense involved cannot compare with the simplicity and accuracy of the method of this invention. The automatic wire wrap technique involves equipment which is much more complex and expensive than the system of this invention as is the equipment necessary to prepare the complete harness.

The use of flat conductor cables having a plurality of conductors accurately positioned with respect to each other provides for a much greater density center-to-center of conductors than is possible with any other system. The physical limitations involved in wire wrap systems, in soldering operations and taper pin systems, which normally involve single round wire conductors, are not present. Accordingly, many more interconnections can be effected in a substantially smaller space, thus bringing about a great saving in the physical size and weight of a computer or other device.

In addition, the system of this invention makes it possible to determine circuit paths by computer operation so that the length of conductor involved in a particular circuit element can be materially shorter. This is important in modern high-speed computers where switching times are measured in terms of nanoseconds. Additionally, since the spacing of conductors between elements is accurately determined, the capacitance of the system can be calculated with an accuracy not previously available. This provides for a more accurate calculation of the electrical properties of the entire circuit.

The system of this invention provides a degree of mechanical and electrical flexibility which surpasses any of the present systems being employed. Mechanical flexibility is provided since the flat cables and hence their conductors themselves are flexible and can be attached and positioned with relation to each other in almost any manner desired. Thus, an X run of cable can be twisted or the Y run of cable can be twisted a limited amount, thereby permitting a much closer packing of X–Y connectors. Likewise, this system is electrically flexible, since it can be automatically programmed and formed entirely as a complete harness. The system once installed can be repaired in the field or new circuits can be arranged by the simple replacement of selected masks or the entire system rewired by the replacement of the entire continuous mask.

If random or scramble wiring is desirable, X connector 70 may be employed, and the system illustrated in FIG. 14 may be used. Likewise, it is possible to combine the greater degree of flexibility provided by X connectors 70 with the more basic system illustrated in FIGS. 4–6 as desired.

In summary then, the wiring system of this invention, as well as its method of preparation involves a flexibility never before available and eliminates a great deal of expense which is involved in other systems being employed. The ability to repair a device or to rewire a system made possible by the wiring harness of this invention is likewise not available in any other known system. The system of this invention is less expensive to prepare and less expensive to repair.

With the above description in mind and the modifications discussed, it will be appreciated by those skilled in the art that many modifications and changes can be employed without departing from the spirit of this invention or the scope of the appended claims. Having thus described the preferred embodiments of this invention and the methods forming the same, we intend to be bound not by the specific disclosure but by the scope of the appended claims.

What is claimed:

1. A connector for a wiring system having at least a pair of conductors comprising a pair of spaced supporting members, each having its inner surface in a facing relationship with that of the other, an insulating mask member disposed between the inner surfaces of said pair of supporting members, said pair of supporting members being adapted to receive a different one of the conductors of a pair of conductors between each of said inner surfaces thereof and said mask member, said mask member having an opening disposed therein for each pair of conductors to be connected to one another, means disposed on at least one of said supporting members for applying concentrated pressure to the area of said pair of conductors in alignment with said opening to urge said pair of conductors toward one another, and means for urging said supporting members toward one another, whereby each pair of conductors to be connected to one another when having a portion of each aligned with said opening are connected to one another through said opening in response to the urging of said supporting members toward one another.

2. A connector for a wiring system having at least a pair of conductors comprising a pair of spaced flat plates, each having its inner surface in a facing relationship with that of the other, an insulating mask member disposed between the inner surfaces of said pair of flat plates, said pair of flat plates being adapted to receive a different one of the conductors of a pair of conductors between each of said inner surfaces thereof and said mask member, said mask member having an opening disposed therein for each pair of conductors to be connected to one another, means disposed on at least one of said flat plates for applying concentrated pressure to the area of said pair of conductors in alignment with said opening to urge said pair of conductors toward one another, and means for urging said flat plates toward one another, whereby each pair of conductors to be connected to one another when having a portion of each aligned with said opening are connected to one another through said opening in response to the urging of said flat plates toward one another.

3. A connector for a wiring system having at least a pair of conductors comprising a pair of spaced supporting members, each having its inner surface in a facing relationship with that of the other, an insulating mask member of flexible material disposed between the inner surfaces of said pair of supporting members, said pair of supporting members being adapted to receive a different one of the conductors of a pair of conductors between each of said inner surfaces thereof and said mask member, said mask member having an opening disposed therein for each pair of conductors to be connected to one another, means disposed on at least one of said supporting members for applying concentrated pressure to the area of said pair of conductors in alignment with said opening to urge said pair of conductors toward one another, and means for urging said supporting members toward one another, whereby each pair of conductors to be connected to one another when having a portion of each aligned with said opening are connected to one another through said opening in response to the urging of said supporting members toward one another.

4. A connector for a wiring system having at least a pair of conductors comprising a pair of spaced supporting members, each having its inner surface in a facing relationship with that of the other, an insulating mask member disposed between the inner surfaces of said pair of supporting members, said pair of supporting members being adapted to receive a different one of the conductors of a pair of conductors between each of said inner surfaces thereof and said mask member, said mask member having an opening disposed therein for each pair of conductors to be connected to one another, means for positioning said mask member in registration with said supporting members, means disposed on at least one of said supporting members for applying concentrated pressure to the area of said pair of conductors in alignment with said opening to urge said pair of conductors toward one another, and means for urging said supporting members toward one another, whereby each pair of conductors to be connected to one another when having a portion of each aligned with said opening are connected to one another through said opening in response to the urging of said supporting members toward one another.

5. A connector for a wiring system having at least a pair of conductors comprising a pair of spaced supporting members, each having its inner surface in a facing relationship with that of the other, an insulating mask member disposed between the inner surfaces of said pair of supporting members, said pair of supporting members being adapted to receive a different one of the conductors of a pair of conductors between each of said inner surfaces thereof and said mask member, said mask member having an opening disposed therein for each pair of conductors to be connected to one another, said mask member and said supporting members each having additional openings in alignment with one another, means for extending through said additional openings for positioning said mask member and said supporting members in registration with one another, means disposed on at least one of said supporting members for applying concentrated pressure to the area of said pair of conductors in alignment with said opening to urge said pair of conductors toward one another, and means for urging said supporting members toward one another, whereby each pair of conductors to be connected to one another when having a portion of each aligned with said opening are connected to one another through said opening in response to the urging of said supporting members toward one another.

6. A connector for a wiring system having at least a pair of conductors comprising a pair of spaced supporting members, each having its inner surface in a facing relationship with that of the other, an insulating mask member disposed between the inner surfaces of said pair of supporting members, said pair of supporting members being adapted to receive a different one of the conductors of a pair of conductors between each of said inner surfaces thereof and said mask member, said mask member having an opening disposed therein for each pair of conductors to be connected to one another, said mask member and said supporting member each having additional openings in alignment with one another, means disposed on at least one of said supporting members for applying concentrated pressure to the area of said pair of conductors in alignment with said opening to urge said pair of conductors toward one another, and means extending through said additional openings for urging said supporting members toward one another and for positioning said mask member and said supporting members in registration with one another, whereby each pair of conductors to be connected to one another when having a portion of each aligned with said opening are connected to one another through said opening in response to the urging of said supporting members toward one another.

7. A connector for a wiring system having at least a pair of conductors comprising a pair of spaced supporting members, each having its inner surface in a facing relationship with that of the other, an insulating mask member disposed between the inner surfaces of said pair of supporting members, said pair of supporting members being adapted to receive a different one of the conductors of a pair of conductors between each of said inner surfaces thereof and said mask member, said mask member having an opening disposed therein for each pair of conductors to be connected to one another, means for urging said supporting members toward one another, and additional means disposed adjacent the inner surface of at least one of said supporting members in alignment with the opening in said mask member for urging a conductor adjacent thereto of a pair of conductors to connect through said opening therein to the other conductor of said pair in response to the urging of said supporting members toward one another, whereby each pair of conductors to be connected to one another when having a portion of each aligned with said opening are connected to one another through said opening.

8. A connector for a wiring system having at least a pair of conductors comprising a pair of spaced supporting members, each having its inner surface in a facing relationship with that of the other, an insulating mask member disposed between the inner surfaces of said pair of supporting members, said pair of supporting members being adapted to receive a different one of the conductors of a pair of conductors between each of said inner surfaces thereof and said mask member, said mask member having an opening disposed therein for each pair of conductors to be connected to one another, means for urging said supporting members toward one another and a stud member disposed adjacent the inner surface of at least one of said supporting members in alignment with the opening in said mask member for urging a conductor adjacent thereto of a pair of conductors to connect through said opening therein to the other conductor of said pair in response to the urging of said supporting member toward one another, whereby each pair of conductors to be connected to one another when having a portion of each aligned with said opening are connected to one another through said opening.

9. A connector for a wiring system having at least a pair of conductors comprising a pair of spaced supporting members, each having its inner surface in a facing relationship with that of the other, an insulating mask member disposed between the inner surfaces of said pair of supporting members, said pair of supporting members being adapted to receive a different one of the conductors of a pair of conductors between each of said inner surfaces thereof and said mask member, said mask member having an opening disposed therein for each pair of conductors to be connected to one another, means for urging said supporting members toward one another, and a resilient stud member disposed adjacent the inner surface of at least one of said supporting members in alignment with the opening in said mask member for urging a conductor adjacent thereto of a pair of conductors to connect through said opening therein to the other conductor of said pair in response to the urging of said supporting members toward one another, whereby each pair of conductors to be connected to one another when having a portion of each aligned with said opening are connected to one another through said opening in response to the urging of said supporting members toward one another.

10. A connection for a wiring system comprising a pair of runs each having at least one conductor therein, and a connector including a pair of spaced supporting members, each having its inner surface in a facing relationship with that of the other, an insulating mask member disposed between the inner surface of said pair of supporting members, said mask member having an opening disposed therein for each pair of conductors to be connected to one another, each conductor of said pair of conductors being of a different one of said runs, a different one of said pair of conductors being disposed between each of said inner surfaces thereof and said mask member with a portion of each of said conductor being aligned with said opening, means disposed on at least one of said supporting members for applying concentrated pressure to the area of said pair of conductors in alignment with said opening to urge said pair of conductors toward one another, and means for urging said supporting members toward one another, whereby said portion of each of said pair of conductors are connected to one another through said opening in response to the urging of said supporting members toward one another.

11. A connection for a wiring system comprising a pair of runs each having at least one conductor therein, an insulating coating applied to said conductors, and a connector including a pair of spaced supporting members, each having its inner surface in a facing relationship with that of the other, an insulating mask member disposed between the inner surface of said pair of supporting members, said mask member having an opening disposed therein for each pair of conductors to be connected to one another, each conductor of said pair of conductors being of a different one of said runs, a portion of said coating of each of said pair of conductors having a relief therein for exposing a portion of each of said pair of conductors, a different one of said pair of conductors being disposed between each of said inner surfaces thereof and said mask member with the exposed portion of each facing said opening, means disposed on at least one of said supporting members for applying concentrated pressure to the area of said pair of conductors in alignment with said opening to urge said pair of conductors toward one another, and means for urging said supporting members toward one another, whereby said exposed portions of said pair of conductors are connected to one another through said opening in response to the urging of said supporting members toward one another.

12. A connection for a wiring system comprising a pair of substantially flat cables each having at least one conductor therein, insulating coating applied to said conductors, and a connector including a pair of spaced supporting members, each having its inner surface in a facing relationship with that of the other, an insulating mask member disposed between the inner surface of said pair of supporting members, said mask member having an opening disposed therein for each pair of conductors to be connected to one another, each conductor of said pair of conductors being of a different one of said cables, a portion of said coating of each of said pair of conductors having a relief therein for exposing a portion of each of said conductors, a different one of said pair of conductors being disposed between each of said inner surfaces thereof and said mask member with the exposed portion of each facing said opening, means disposed on at least one of said supporting members for applying concentrated pressure to the area of said pair of conductors in alignment with said opening to urge said pair of conductors toward one another, and means for urging said supporting members toward one another, whereby exposed portions of said pair of conductors are connected to one another through said opening in response to the urging of said supporting members toward one another.

13. A connection for a wiring system comprising a pair of cables each having a plurality of conductors therein disposed substantially parallel to one another in a common plane, an insulating coating applied to said conductors, and a connector including a pair of spaced supporting members, each having its inner surface in a facing relationship with that of the other, an insulating mask member disposed between the inner surface of said pair of supporting members, said mask member having an opening disposed therein for each pair of conductors to be connected to one another, each conductor of said pair of conductors being of a different one of said cables, a portion of said coating of each of said pair of conductors having a relief therein for exposing a portion of each of said conductors, a different one of said pair of conductors being disposed between each of said inner surfaces thereof and said mask member with the exposed portion of each facing said opening, means disposed on at least one of said supporting members for applying concentrated pressure to the area of said pair of conductors in alignment with said opening to urge said pair of conductors toward one another, and means for urging said supporting members toward one another, whereby exposed portions of said pair of conductors are connected to one another through said opening in response to the urging of said supporting members toward one another.

14. A connector for a wiring system having at least a pair of conductors comprising a pair of spaced supporting members, each having its inner surface in a facing relationship with that of the other, an insulating mask member disposed between the inner surfaces of said pair of supporting members, said pair of supporting members being adapted to receive a different one of the conductors of a pair of conductors between each of said inner surfaces thereof and said mask member, said mask member having an opening disposed therein for each pair of conductors to be connected to one another, means disposed on at least one of said supporting members for applying concentrated pressure to the area of said pair of conductors in alignment with said opening to urge said pair of conductors toward one another, and means for camming said supporting members toward one another, whereby each pair of conductors to be connected to one another when having a portion of each aligned with said opening are connected to one another through said opening in response to the urging of said supporting members toward one another.

15. A connector for a wiring system having at least a pair of conductors comprising a pair of spaced supporting members, each having its inner surface in a facing relationship with that of the other, an insulating mask member disposed between the inner surfaces of said pair of supporting members, said pair of supporting members being adapted to receive a different one of the conductors of a pair of conductors between each of said inner surfaces thereof and said mask member, said mask member having an opening disposed therein for each pair of conductors to be connected to one another, said mask member and said supporting members each having additional openings in alignment with one another, means for extending through said additional openings for positioning said mask member and said supporting members in registration with one another, a base member connected to said positioning means, and cam means engaged with said base member for urging said supporting members toward one another, whereby each pair of conductors to be connected to one another when having a portion of each aligned with said opening are connected to one another through said opening in response to the urging of said supporting members toward one another.

16. A connector for a wiring system having at least a pair of conductors comprising a pair of spaced supporting members, each having its inner surface in a facing relationship with that of the other, an insulating mask member disposed between the inner surfaces of said pair of supporting members, one of said pair of supporting members having at least one conducting member disposed adjacent said inner surface thereof, said conducting member being adapted for connection to one of said pair of conductors, the other of said pair of supporting members being adapted to receive the other conductor of the pair of conductors between said inner surface thereof and said mask member, said mask member having an opening disposed therein for each pair of a conductor and a conducting member to be connected to one another, means disposed on at least one of said supporting members for applying concentrated pressure to the area of said pair of conductors in alignment with said opening to urge said pair of conductors toward one another, and means for urging said supporting members toward one another, whereby a pair of a conductor and a conducting member when having a portion of each aligned with said opening are connected to one another through said opening in response to the urging of said supporting members toward one another.

17. A connector for a wiring system having at least a pair of conductors comprising a pair of spaced supporting members, each having its inner surface in a facing relationship with that of the other, an insulating mask member disposed between the inner surfaces of said pair of supporting members, one of said pair of supporting members having at least one conducting member disposed adjacent said inner surface thereof, said conducting member having a terminal for connection to one of a pair of conductors, the other of said pair of supporting members being adapted to receive the other conductor of the pair of conductors between said inner surface thereof and said mask member, said mask member having an opening disposed therein for each pair of a conductor and a conducting member to be connected to one another, means disposed on at least one of said supporting members for applying concentrated pressure to the area of said pair of conductors in alignment with said opening to urge said pair of conductors toward one another, and means for urging said supporting members toward one another, whereby a pair of a conductor and a conducting member when having a portion of each aligned with said opening are connected to one another through said opening in response to the urging of said supporting members toward one another.

18. A connector for a wiring system having at least a pair of conductors comprising a pair of spaced supporting members, each having its inner surface in a facing relationship with that of the other, an insulating mask member disposed between the inner surfaces of said pair of supporting members, one of said pair of supporting members having at least one conducting member disposed adjacent said inner surface thereof, said conducting member having at least one projection thereon, and a terminal for connection to one of a pair of conductors, the other of said pair of supporting members being adapted to receive the other conductor of the pair of conductors between said inner surface thereof and said mask member, said mask member having an opening disposed therein for each pair of a conductor and a projection of said conducting member to be connected to one another, means disposed on at least one of said supporting members for applying concentrated pressure to the area of said pair of conductors in alignment with said opening to urge said pair of conductors toward one another, and means for urging said supporting members toward one another, whereby a pair of a conductor and a projection of said conducting member when having a portion of each aligned with said opening are connected to one another through said opening in response to the urging of said supporting members toward one another.

19. A connector for a wiring system having at least one run of a plurality of conductors and at least one other run of a plurality of other conductors, the run and the other run having a portion thereof disposed adjacent one another, the adjacent portions of the run and the other run having the conductors therein exposed to one another in a facing relationship, said connector comprising an insulating mask member adapted to be disposed between the facing exposed conductors, said mask member having an opening disposed therein for each pair of a conductor and of another conductor to be connected to one another, projection means adapted to extend toward the adjacent portions of the runs for urging at least one of each pair of the conductor and the other conductor to be connected to one another to move with respect to said opening in said mask member in order to cause the pair to contact and thereby connect directly to one another through said opening, said projection means being disposed adjacent to the side opposite said mask member of at least one of each pair of the conductor and the other conductor to be connected to one another and being adapted to apply concentrated pressure to a portion of the one conductor restricted to that adjacent the area of said opening, and means for applying force to said projection means to enable said projection means to apply said concentrated pressure.

20. A connection in a wiring system comprising at least one run of a plurality of conductors and at least one other run of a plurality of other conductors, said run and said other run having a portion thereof disposed adjacent one another, the adjacent portions of said run and said other run having the conductors therein exposed to one another in a facing relationship, an insulating mask member disposed between said facing exposed conductors, said mask member having an opening disposed therein for each pair of said conductor and said other conductor to be connected to one another, projection means extending toward the adjacent portions of said runs urging at least one of each of said pair of said conductor and said other conductor to be connected to one another through said opening, said projection means being disposed adjacent to the side opposite said mask member of at least one of each pair of said conductor and said other conductor to be connected to one another and applying concentrated pressure to a portion of the one conductor restricted to that adjacent the area of said opening, and means applying force to said projection means to enable said projection means to apply said concentrated pressure.

References Cited

UNITED STATES PATENTS

| | | | |
|---|---|---|---|
| 2,889,532 | 6/1959 | Slack. | |
| 3,002,169 | 9/1961 | Kamm | 339—18 |
| 3,070,650 | 12/1962 | Stearns | 174—88 |
| 3,083,261 | 3/1963 | Francis et al. | 174—88 |
| 3,182,535 | 5/1965 | Quakenbush | 83—8 |
| 3,196,721 | 7/1965 | Brandon | 83—8 |
| 3,242,384 | 3/1966 | Klehm | 317—101 |

FOREIGN PATENTS

| | | |
|---|---|---|
| 940,518 | 10/1963 | Great Britain. |

DARRELL L. CLAY, *Primary Examiner.*

L. E. ASKIN, L. H. MYERS, *Examiners.*